United States Patent [19]

Colvert et al.

[11] Patent Number: 4,828,802

[45] Date of Patent: May 9, 1989

[54] METHOD OF FCCU SPENT CATALYST REGENERATION AND EXTENSION TUBE MEANS

[75] Inventors: James H. Colvert; Thomas A. Lionetti, both of Houston; John P. MacLean, Stafford, all of Tex.

[73] Assignee: Texaco Inc., White Plains, N.Y.

[21] Appl. No.: 410,725

[22] Filed: Aug. 23, 1982

[51] Int. Cl.[4] .................. F27B 15/02; F27B 15/08
[52] U.S. Cl. .................... 422/144; 141/312; 422/145; 422/223; 422/232; 502/20
[58] Field of Search ............ 422/144, 145, 223, 232; 252/417; 141/312

[56] References Cited

U.S. PATENT DOCUMENTS

| | | | |
|---|---|---|---|
| 3,190,470 | 6/1965 | Ritter | 422/232 X |
| 3,433,733 | 3/1969 | Bunn, Jr. et al. | 208/150 |
| 3,571,946 | 3/1971 | Karweil et al. | 422/145 X |
| 3,806,324 | 4/1974 | MacLean et al. | 23/288 B |
| 3,926,843 | 12/1975 | Owen | 422/144 X |
| 3,959,117 | 5/1976 | Bunn, Jr. et al. | 208/13 |
| 4,035,153 | 7/1977 | Bunn, Jr. et al. | 422/144 |
| 4,051,069 | 9/1977 | Bunn, Jr. et al. | 422/144 X |
| 4,060,395 | 11/1977 | Castagnos, Jr. et al. | 422/144 |
| 4,062,759 | 12/1977 | Castagnos, Jr. et al. | 422/144 X |
| 4,097,243 | 6/1978 | Bartholic | 23/288 S |
| 4,150,090 | 4/1979 | Murphy et al. | 422/145 X |
| 4,223,843 | 9/1980 | Smith et al. | 239/558 |
| 4,304,659 | 12/1981 | Pratt et al. | 252/417 X |

Primary Examiner—Barry S. Richman
Assistant Examiner—Amalia L. Santiago
Attorney, Agent, or Firm—Robert A. Kulason; Jack H. Park; Richard A. Morgan

[57] ABSTRACT

A method for supplying spent catalyst to a catalyst regenerator comprises (1) guiding the flow of spent catalyst from the lower end of a spent catalyst standpipe downwardly therefrom and (2) curving the downward flow of spent catalyst away from the wall of the catalyst regenerator towards the vertical center line of the air distributor for providing the most thorough and even distribution of spent catalyst and air. An extension tube means for performing the method is also disclosed.

2 Claims, 2 Drawing Sheets

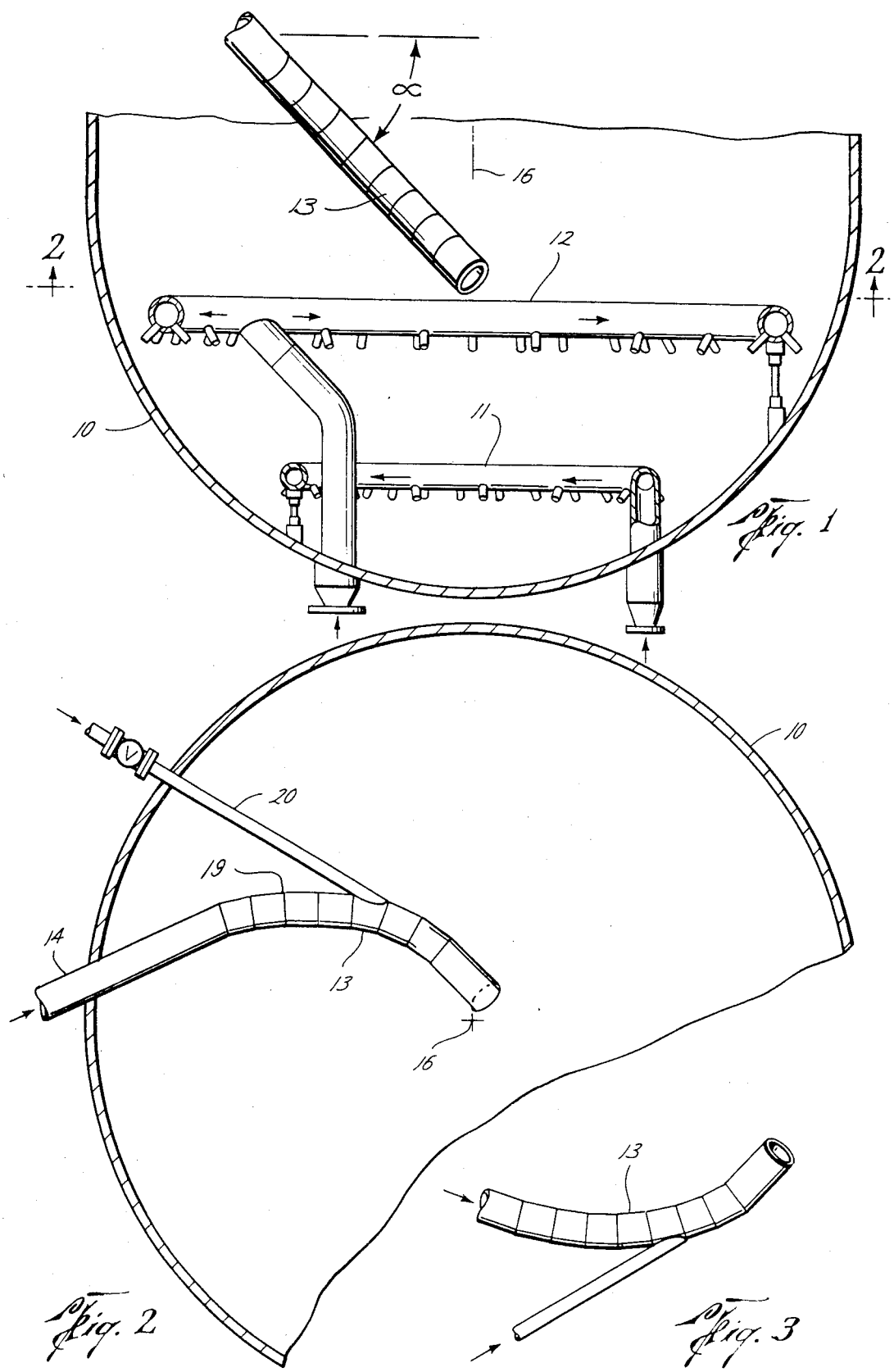

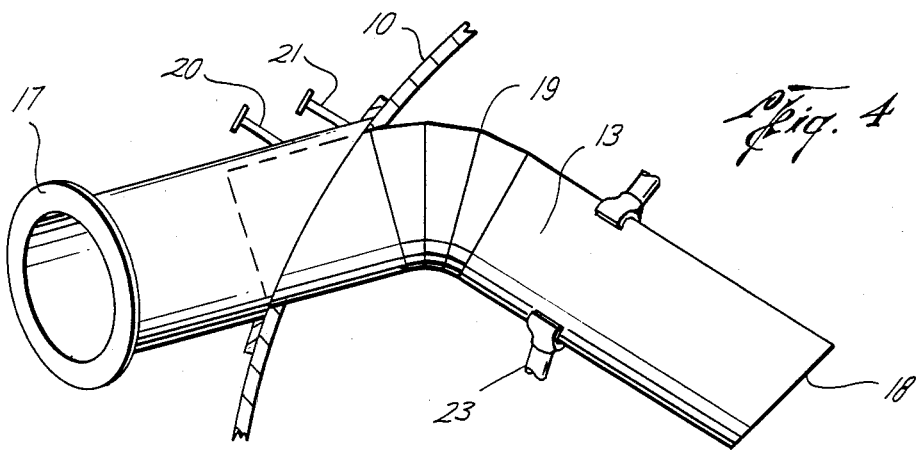
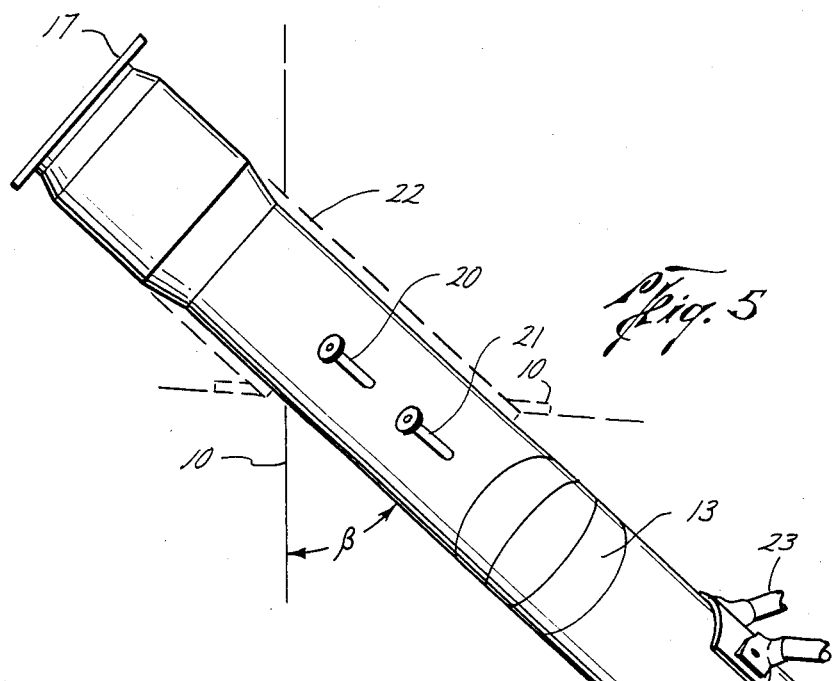
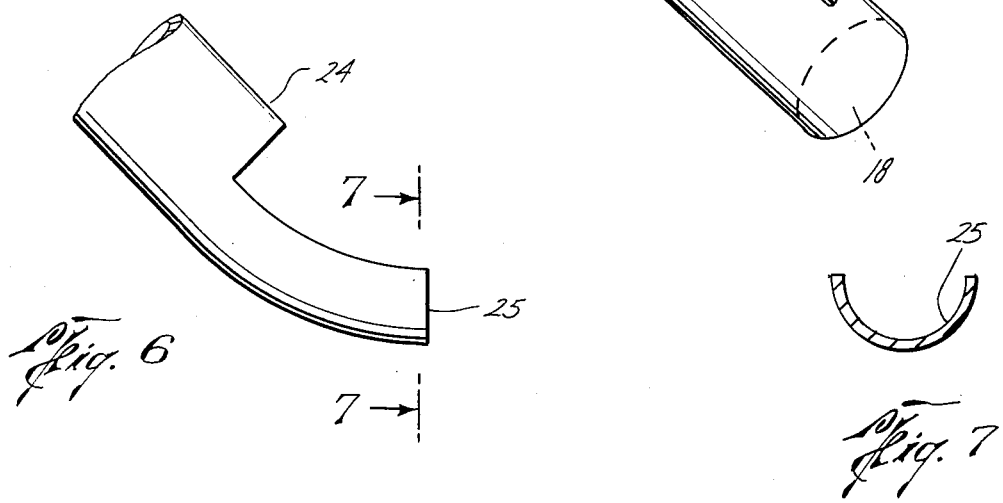

METHOD OF FCCU SPENT CATALYST REGENERATION AND EXTENSION TUBE MEANS

BACKGROUND OF THE INVENTION

A problem with the spent catalyst regenerator of a fluid catalytic cracking unit (FCCU) has been thorough and even mixing and distribution of the spent catalyst with the oxygen containing gas or air in the catalyst regenerator for burning off the carbonaceous deposits on the catalyst, as "coke", so that the regenerated catalyst may be reused in the FCCU. The efficiency of the regeneration process is dependent upon a uniform distribution of air through the spent catalyst zone.

Inventors have found greater efficiency results with contacting the catalyst with air just over the center of the air distributor or air ring adjacent to where the air initially leaves the air ring. Here the highest carbon content catalyst is exposed to the richest (highest oxygen content) air. Inventors increased efficiency by guiding the catalyst from the spent catalyst stand pipe down into the catalyst regenerator and over near the center of the regeneration zone for obtaining the most even distribution of the spent catalyst and air. To accomplish this guiding of the spent catalyst down to a position just over the air ring and adjacent the center of the air ring, a curved extention tube has been designed and is utilized by being connected to the lower end of the spent catalyst standpipe where it penetrates the catalyst regenerator wall. To provide even distribution of spent catalyst and air, this extension tube angles down sufficiently to maintain gravity and downward flow of the spent catalyst to exit near the center of the distributor. Air jets spaced along the curved extension tube may insure continual movement and propulsion of the spent catalyst to eject over the air ring.

The prior art, as co-assignee's typical U.S. Pat. No. 4,223,843 merely ejected the spent catalyst from a hole in the wall of the spent catalyst regenerator and aimed it in the general direction of the air ring.

OBJECTS OF THE INVENTION

Accordingly, a primary object of this invention is to provide a new method for supplying spent catalyst to a catalyst regenerator for providing the most even distribution of spent catalyst and air.

Another primary object of this invention is to provide a new extension tube for a spent catalyst standpipe for carrying out the above method for supplying spent catalyst to the catalyst regenerator for providing the most even distribution of spent catalyst and air.

A further object of this invention is to provide a spent catalyst entry that has a side entry, such as a tangential entry to the cylindrical wall surface.

A still further object of this invention is to provide a mechanism for transporting spent catalyst from a spent catalyst standpipe to the proximity of an air distributor ring that is easy to operate, is of simple configuration, is economical to build and assemble, and is of greater efficiency for the most even distribution of spent catalyst and air.

Other objects and various advantages of the disclosed method for supplying spent catalyst to a catalyst regenerator and an efficient mechanism for carrying out the above method will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, more than one form of the invention wherein like reference numerals designate corresponding parts in several views in which:

FIG. 1 is a schematic diagrammatic vertical sectional view of the lower portion of a spent catalyst regenerator with the new spent catalyst standpipe extension tube therein;

FIG. 2 is a schematic horizontal sectional view taken at 2—2 on FIG. 1;

FIG. 3 is an enlarged bottom view of a portion of the new spent catalyst standpipe extension tube;

FIG. 4 is an enlarged top view of a slightly modified new spent catalyst standpipe extension tube per se;

FIG. 5 is a rear view of the extension tube of FIG. 4, and rotated 90° clockwise;

FIG. 6 is a modification of FIG. 5; and

FIG. 7 is a section at 7—7 on FIG. 6.

The invention disclosed herein, the scope of which being defined in the appended claims is not limited in its application to the details of construction and arrangement of parts shown and described, since the invention is capable of being in the form of other embodiments and of being practiced or carried out in various other ways. Also, it is to be understood that the phraseology or terminology employed here is for the purpose of description and not of limitation. Further, many modifications and variations of the invention as hereinafter set forth will occur to those skilled in the art. Therefore, all such modifications and variations which are within the spirit and scope of the invention herein are included and only such limitations should be imposed as are indicated in the appended claims.

DESCRIPTION OF THE INVENTION

Two related embodiments of my invention are disclosed herein, a method for supplying spent catalyst to a catalyst regenerator and a mechanism for practicing the above method comprising a particular standpipe extension tube, all curved portions of which being to particular limitations set forth hereinafter.

The basic method for supplying spent catalyst to a catalyst regenerator 10 having an air distributor, such as but not limited to air rings 11 and 12 in the lower portion thereof and a spent catalyst standpipe 14 with a lower end extending down to a position adjacent the wall of the catalyst regenerator comprising the steps of, (1) guiding the flow of spent catalyst from the lower end of the spent catalyst standpipe 14 downwardly therefrom, through the catalyst regenerator 10 wall, and toward the catalyst regenerator bottom, and (2) curving the downward flow of spent catalyst away from the wall of the catalyst regenerator towards the vertical center line 16 of the air ring 12 for providing the most even distribution of spent catalyst and air.

The method above may be modified as follows, (1) guiding the curved flow path of spent catalyst so that the angle $\alpha$ from the horizon of all portions thereof being greater than the angle of repose of the internal resistance of the catalyst in the extension tube for providing the most even distribution of spent catalyst and air.

The method above may be modified further as follows, (1) guiding the catalyst in its curved flow path so that the angle from the horizon of all portions thereof being at an angle α not less than an angle greater than the angle of repose of the internal resistance of the catalyst in the extension tube for providing the most even distribution of spent catalyst and air.

The basic method above may be limited as follows, (1) curving the flow of spent catalyst from the lower end of the spent catalyst standpipe away from the wall of the catalyst regenerator to eject the catalyst just over the air distributor or air ring in juxtaposition with the vertical center line of the air ring for providing the most even distribution of spent catalyst and air.

The basic method above may also be recited thus, (1) guiding the flow of spent catalyst from the lower end of the spent catalyst standpipe downwardly therefrom at an angle of less than 45° to the tangent of the wall at the point of penetration by the spent catalyst for insuring continuous movement and thus providing the most even distribution of spent catalyst and air.

An alternate method of guiding the flow of spent catalyst from the lower end of the standpipe may comprise the following step, (1) curving the downward flow of spent catalyst from the lower end (25, FIG. 6) of the spent catalyst standpipe upwardly to eject the spent catalyst in a horizontal plane just over the air distributor and in juxtaposition with the vertical center line of the air distributor for providing the most even distribution of spent catalyst and air.

THE PREFERRED EMBODIMENT FOR PRACTICING THE INVENTION

The above methods for supplying spent catalyst to a catalyst regenerator may be performed by other mechanisms than that disclosed in the Figures. The mechanism disclosed herein may be operated by other methods than those disclosed, as by hand. The preferred system for performing the method is disclosed in FIGS. 1-5.

FIG. 1 is a vertical section of the lower portion of a spent catalyst regenerator 10 with an air distributor, such as but not limited to smaller and larger concentric air rings 11 and 12, respectively, for maintaining the fluidized bed of spent catalyst as the carbonaceous deposit on the catalyst as "coke" is burned off the catalyst with the injected air.

As seen in the prior art as in the above mentioned Assignee's U.S. Pat. No. 4,223,843, FIG. 1, a spent catalyst standpipe projects down to an opening in the regenerator for ejecting the spent catalyst into the catalyst regenerator for being rejuvenated by burning off the "coke" with the injected air from the air distributors. Instead, FIGS. 1-5 of the present invention illustrate the new extension tube 13 protruding down at an angle α below the horizontal and joined to the spent catalyst standpipe 14, FIG. 2, at or adjacent to the opening 15 (not shown) in the regenerator wall. This extension tube curves over from the wall to adjacent the vertical center line 16 of the air distributor or concentric air rings 11, 12 and down to a position just above the upper air ring 12. The spent catalyst is thus ejected to the center of the air distributors and down just above them, which accordingly provides the most even distribution of spent catalyst and air in the fluidized bed.

While two air distributors are illustrated, actually only one or more other types of air distributors may be utilized, depending on the preferred design.

A feature of a new spent catalyst extension tube 13 is that from the upper end 17, FIGS. 4, 5, thereof to its lower end 18, all portions of the curved extension tube have angles β that are equal to or greater than 5° greater than the angle of repose of internal resistance of the tube to the horizon. This angle of internal resistance is usually either equal to or a few millesimals greater than the poured or drain angle of repose. Or, the angle may be expressed as being equal to or not less than 5° greater than the angle of repose from the horizon. The use of this angle is very important to maintain constant flow of the catalyst.

The spent catalyst extension tube 13, FIG. 4, is preferably bent by utilizing a mitered joint 19, i.e, two or more equal diameter tubular segments or conical sections attached to each other as by welding, to turn and eject the flow of spent catalyst toward the vertical center line 16 of the air distributor or distributors and spaced just over the upper air ring 12 which thus provides the most thorough and even distribution of spent catalyst and air. While the modification of FIGS. 1-3 has 7 mitered joints, that of FIGS. 9-5 has only 3 mitered joints for illustrating various numbers of mitered joints may be utilized in the curve of the new spent catalyst extension tube.

To increase the flow of spent catalyst through the extension tube, one or more high pressure gas jets (preferably air), 20, 21 may be mounted thereon to accelerate the flow therein in the extension tube.

FIGS. 4 and 5 illustrate the upper end 17 of the extension tube 13 being formed with a flange for connecting to a similarly flanged lower end of the spent catalyst standpipe (not shown here).

Support legs 23 may be connected, as by welding, the extension tube for holding it in position in the regenerator 10.

FIG. 5 also shows a sleeve 22 secured, as by welding, to the wall of the regenerator 10 around the opening 14 for support of the spent catalyst extension tube which position is extending down in the regenerator at the angle β to the vertical wall of the regenerator 16.

FIG. 6, a modification of FIG. 5, illustrates an alternate extension tube 24 with its lower end 25 curved up to a substantially horizontal position just above the air distributor (not shown) and adjacent the vertical centerline (not shown) of the air distributor. As illustrated, the end portion 25 is U-shaped with the top of the end portion being open. This shaped extension tube lower end 25 tends to disseminate the spent catalyst more widely over the air distributor for improved mixing and exposure to the hot air as the catalyst ejects from the lower end of the extension tube 14.

FIG. 7 is a sectional view at 7—7 on FIG. 6.

Accordingly, it will be seen that both the method for supplying spent catalyst to a catalyst regenerator and a spent catalyst curved extension tube will operate in a manner which meets each of the objects set forth hereinbefore.

While only one method of the invention and one mechanism for carrying out the method have been disclosed, it will be evident that various other methods and modifications are possible in the arrangement and construction of the disclosed method and spent catalyst extension tube without departing from the scope of the invention and it is accordingly desired to comprehend with the purview of this invention such modifications as may be considered to fall within the scope of the appended claims.

We claim:

1. A method for supplying spent catalyst to a catalyst regenerator having an air distributor in the bottom thereof and a spent catalyst standpipe with a lower end extending down to a position adjacent the wall of the catalyst regenerator comprising the steps of,
   (a) guiding the flow of spent catalyst from the lower end of the spent catalyst standpipe downwardly therefrom, through the catalyst regenerator wall, and toward the catalyst regenerator bottom, and
   (b) curving the downward flow of spent catalyst away from the wall of the catalyst regenerator towards the vertical center line of the air distributor, and then
   (c) curving the downward flow of spent catalyst upwardly to eject the spent catalyst in a horizontal plane just over the air distributor and in juxtaposition with the vertical center line of the air distributor for providing the most even distribution of spent catalyst and air.

2. In a catalyst regenerator having an air distributor in the bottom thereof and a spent catalyst standpipe with a lower end adjacent the wall of the catalyst regenerator, means for supplying the spent catalyst from the standpipe lower end to the air distributor comprising,
   (a) extension tube means connected at its upper end to the lower end of the spent catalyst standpipe extending downwardly therefrom, through the wall of the catalyst regenerator, and extending internally thereof, and
   (b) said extension tube means having a lower end curving away from said wall of the catalyst regenerator to terminate at the vertical center line of the air distributor, said lower end of said extension tube means curving upwardly to a horizontal plane just over said air distributor and in juxtaposition with said vertical center line of said air distributor for providing an even distribution of spent catalyst and air.

* * * * *